US005756876A

United States Patent [19]
Wetzel et al.

[11] Patent Number: 5,756,876
[45] Date of Patent: May 26, 1998

[54] METHOD OF SETTING THE SWITCHING POINT OF A CAPACITIVE LEVEL LIMIT SWITCH

[75] Inventors: Gustav Wetzel, Lörrach; Werner Thoren, Steinen, both of Germany

[73] Assignee: Endress + Hauser GmbH + Co., Maulberg, Germany

[21] Appl. No.: 721,113

[22] Filed: Sep. 26, 1996

[30] Foreign Application Priority Data

Sep. 28, 1995 [DE] Germany .................. 195 36 199.7

[51] Int. Cl.$^6$ .................. G01D 18/00; G01F 25/00
[52] U.S. Cl. .................. 73/1.73; 73/1.34; 324/601
[58] Field of Search .................. 340/620; 73/1.31, 73/1.34, 1.73; 364/571.01, 571.05; 324/601

[56] References Cited

U.S. PATENT DOCUMENTS

| | | | |
|---|---|---|---|
| 3,212,318 | 10/1965 | Lomax | 73/7.34 |
| 4,383,444 | 5/1983 | Beaman | 73/1.73 |
| 4,499,767 | 2/1985 | Fathauer | 73/304 C |
| 5,553,479 | 9/1996 | Rauchwerger | 73/1.73 |

FOREIGN PATENT DOCUMENTS 285414  12/1990  Germany .

Primary Examiner—Ernest F. Karlsen
Assistant Examiner—Jose M. Solis
Attorney, Agent, or Firm—Bose McKinney & Evans

[57] ABSTRACT

The capacitive level limit switch used for monitoring the level of a material in a container has a capacitive probe fitted at the height of the level to be monitored so that it is covered by the material when the level has attained this height. The capacitance of the probe is compared to a threshold value determining the switching point, for establishing whether the probe is covered by material or not. For setting the switching point, the capacitance of the probe measured in one condition of the probe is stored as a first reference value and a provisional second reference value is calculated from the first reference value by addition or subtraction of a predetermined amount and is also stored. From the stored reference values the threshold value is calculated according to a prescribed function so that it lies between the two reference values. If it is determined in operation that the measured capacitance value deviates by a certain amount from the second reference value, this measured capacitance value is stored as a new second reference value, and from the reference values now stored a new threshold value is calculated according to the prescribed function.

10 Claims, 1 Drawing Sheet

METHOD OF SETTING THE SWITCHING POINT OF A CAPACITIVE LEVEL LIMIT SWITCH

BACKGROUND OF THE INVENTION

1. Field of the Invention

The invention relates to a method of setting the switching point of a capacitive level limit switch used for monitoring the level of a material in a container and comprising

- a capacitive probe fitted at the height of the level to be monitored so that it is covered by the material when the level has attained this height, the probe having in the covered condition a higher capacitance value than in the uncovered condition,
- a capacitance measuring circuit which measures the capacitance of the probe and outputs a signal representing the measured value of the capacitance, and
- a comparator which compares the measured capacitance value to a variable threshold value determined by the switching point and outputs a binary signal, the status of which depends on whether the measured capacitance value lies above or below the threshold value.

So that capacitive limit switches of the aforementioned kind operate satisfactorily, correctly setting the threshold value determining the switching point is substantial. The capacitive values which the capacitive probes have in the covered and uncovered condition differ, for example, with probes of differing length and they also depend on the properties of the material and on the installation conditions. If the switching point is set too low, it may occur that it is exceeded even by slight changes of the probe capacitance, for instance due to the formation of deposits, although the probe is not covered by the material; whereas if the switching point is set too high, it may happen that it is not attained when the probe is covered by the material. It is, therefore, usual to calibrate the level limit switch following installation of a probe so as to set the optimum switching point.

2. Description of the Prior Art

According to prior art calibration is usually done experimentally by first calibrating the level limit switch to the capacitance value which the probe has in the condition existing at the time (covered or uncovered), then the container is filled or emptied to the extent that the probe is in the other condition, and then the level limit switch is calibrated to the other capacitance value. This method is complicated because it may involve having to add or remove large quantities of the material every time, and in some cases is not implementable. Also of disadvantage is that a difference in time exists between the two calibration procedures which may be quite considerable. In cases in which this method is not implementable, e.g. when an on-going process may not be disturbed, a method is often applied in which the level limit switch is first calibrated to the capacitance value which the probe has in the condition existing at the time and the switching point is established by adding a fixed reference value, e.g. a reference value stored in a table, to the calibration value.

SUMMARY OF THE INVENTION

The object of the invention is to provide a method which permits automatic setting of the threshold value to achieve an optimum switching point by a single calibration to the capacitance value of the probe available at the time.

Achieving this object involves according to the invention that for calibrating the level limit switch and for setting the switching point the measured capacitance value available in the existing operating condition is stored as a first reference value;

a second reference value is stored which is formed by adding a predetermined amount to the first reference value when the first reference value has been sensed with the probe uncovered or by subtracting a predetermined amount from the first reference value when the first reference value has been sensed with the probe covered;

the threshold value is calculated according to a prescribed function from the difference of the two reference values stored so that it lies between the two reference values;

in further operation the capacitance measured values are continually compared to the stored second reference value and a capacitance measured value is stored as a new second reference value when it, should the first reference value have been sensed for a uncovered probe, exceeds the stored second reference value by more than a predetermined amount or, should the first reference value have been sensed with the probe covered, when it fails to attain the stored second reference value by more than a predetermined amount;

after each storage of a new reference value the threshold value is recalculated according to the prescribed function from the difference of the two threshold values stored.

In the method according to the invention only one calibration is done which can be undertaken when the probe is covered or not covered. Subsequently in operation the threshold value determining the switching point on the basis of the capacitance measured values obtained from the monitored level being exceeded or not attained, is recalculated, if necessary, and thus adapted to the properties of the probe and the material optimally. For this purpose no knowledge is required as to the electrical properties of the material. All necessary comparisons, calculations and storage procedures may be implemented automatically in a programmed computer unit.

A capacitive level limit switch suitable for implementing the method according to the invention thus comprises a program-controlled calculating unit for storing the reference values, for implementing the comparisons and for calculating and storing the threshold value, which unit receives at an input the capacitance measured values from the output of the capacitance measurement circuit and furnishes at an output the stored threshold value to the comparator.

Advantageous aspects and further embodiments of the invention are characterized in the sub-claims.

BRIEF DESCRIPTION OF THE DRAWING

Further features and advantages of the invention will be appreciated from the following description of an example embodiment on the basis of the drawing in which.

DESCRIPTION OF THE PREFERRED EMBODIMENTS

Figure 1:
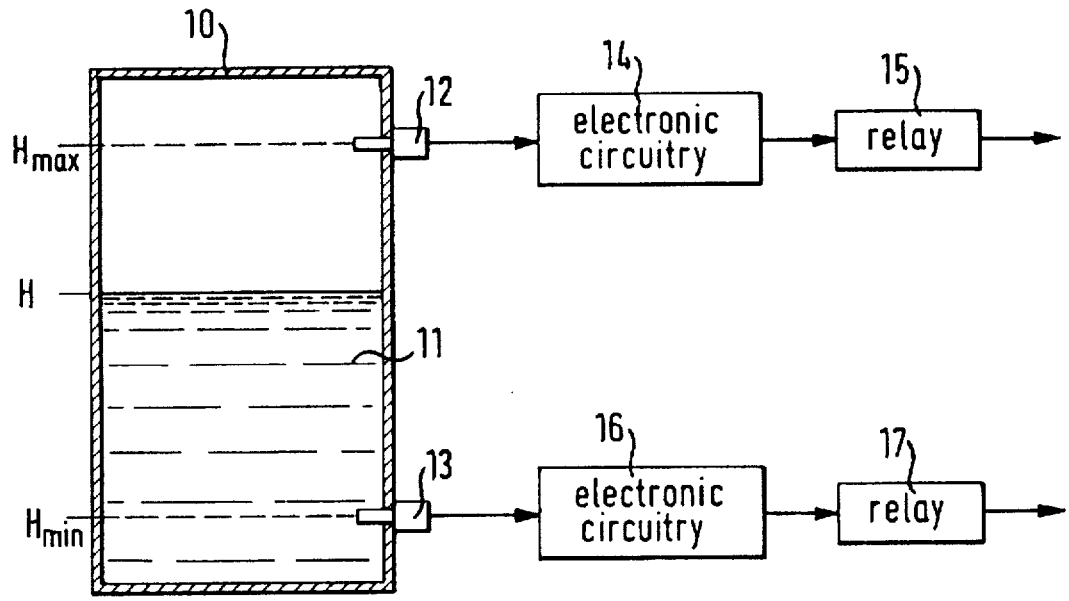
FIG. 1 shows two level limit switches which are applied to a container for monitoring a maximum level and a minimum level.

FIG. 1 shows a container 10 which contains a material 11, the level of which is to be monitored. The level is the height H of the surface of the material above the lowest point of the container. The level is required not to exceed a maximum height $H_{max}$ and not to drop below a minimum height $H_{min}$. For monitoring the maximum level a capacitive probe 12 is fitted to the container 10 so that it is not covered by the material 11 when the level is lower than the height $H_{max}$ and that it is covered by the material 11 when the level attains or exceeds the height $H_{max}$. For monitoring the minimum level a capacitive probe 13 is fitted to the container 10 so that it is covered by the material 11 when the level is higher than the height $H_{min}$ and that it is no longer covered by the material 11 when the level drops below the height $H_{min}$. Each capacitive probe 12, 13 has in the covered condition a capacitance which is greater than the capacitance in the uncovered condition. An electronic circuitry 14 connected to the probe 12 measures the capacitance of the probe and compares the measured capacitance to a threshold value. When the measured capacitance is smaller than the threshold value it is assumed that the probe 12 is not covered by material, i.e. that the maximum level $H_{max}$ in the container 10 is not attained. When, on the other hand, the measured capacitance is greater than the threshold value, then it is assumed that the maximum level $H_{max}$ is attained or exceeded. The electronic circuitry 14 then outputs a signal which energizes a relay 15. This relay 15 may then, for example, discontinue an on-going filling procedure to prevent the container 10 from being overfilled, and/or activate a display device indicating that the maximum level as been attained.

Since the unit consisting of the probe 12, the electronic circuitry 14 and the relay 15 executes a switching action when the level in the container 10 has attained a predetermined limit value, such a unit is also termed as being a level limit switch.

In the same way the probe 13 forms together with an electronic circuitry 16 and a relay 17 a level limit switch which monitors whether the level in the container 16 has dropped below a lower limit value $H_{min}$. In this case the relay 17 is energized for triggering a switching or display action when the electronic circuitry 16 establishes that the measured capacitance of the probe 13 is smaller than the threshold value.

In each case the measured value $C_M$ of the capacitance of the probe 12 or 13 changes between two values:

a minimum capacitance value $C_{min}$ which the probe has when it is not covered by material, and a maximum capacitance value $C_{max}$ which the probe has when it is completely covered by material.

If the probe is covered only partly by the material, its capacitance may assume any intermediate value between these two extreme values, depending on the degree of coverage.

The threshold value $C_S$, determining the switching point, must lie between the two capacitance values $C_{min}$ and $C_{max}$. Correctly selecting the threshold value $C_S$ is important for satisfactory operation of the level limit switch.

The capacitance values $C_{min}$ and $C_{max}$ are not established right from the start. They are different for probes of differing length and also depend on the properties of the material in the container and on the installation conditions. The properties of the material affect in particular the capacitance value $C_{max}$. The capacitance value $C_{min}$ may, for instance, be influenced by the formation of deposits on the probe.

To be able to determine the threshold value $C_S$ for the optimum switching point, the two capacitance values $C_{min}$ and $C_{max}$ must be known. For the probe 12 in FIG. 1 the capacitance value $C_{min}$ can be easily determined since the probe is in normal operation not covered by the material, so that the measurement of the probe capacitance directly results in the capacitance value $C_{min}$ for the probe in the uncovered condition. Establishing the capacitance value $C_{max}$ by measurement is, however, usually not directly possible, since for this purpose the container 10 needs to be filled up to more than the maximum level $H_{max}$ which is rather laborious and in some cases may even be impossible. Conversely, for the probe 13 in FIG. 1 it is easy to establish the capacitance value $C_{max}$ since this probe is covered by the material in normal operation so that measuring the probe capacitance directly results in the capacitance value $C_{max}$. Establishing the capacitance value $C_{min}$ by measurement is, however, usually not directly possible, since for this purpose the container 10 needs to be emptied to more than the minimum level $H_{min}$ which is rather laborious and in some cases may even be impossible.

Figure 2:
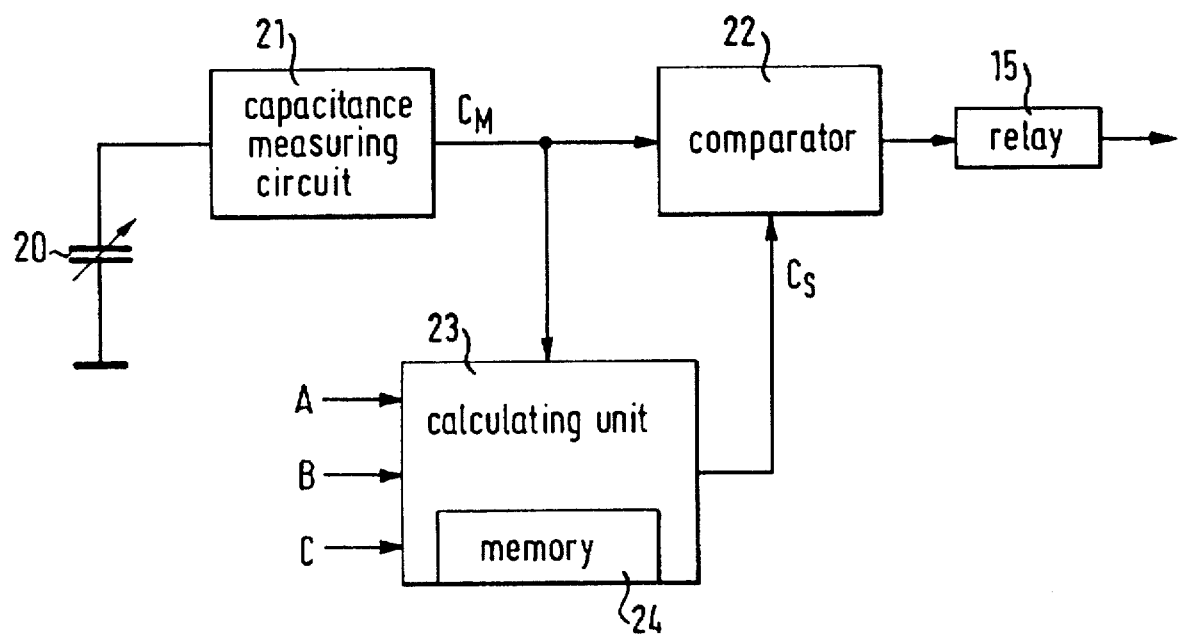
FIG. 2 is a block diagram of the electronic circuit of one of the level limit switches shown in FIG. 1.

With reference to FIG. 2 it will now be explained how the threshold value $C_s$ can be set for achieving an optimum switching point by means of a single calibration to either the capacitance value $C_{min}$ with the probe uncovered or to the capacitance value $C_{max}$ with the probe covered, without knowing the other capacitance value in each case.

In FIG. 2 the capacitance $C_M$ of the probe 12 is represented symbolically by a variable capacitor 20. Furthermore, the electronic circuitry 14 of the level limit switch is shown in more detail, it containing a capacitance measuring circuit 21, a comparator 22 and a calculating unit 23. The capacitance measuring circuit 21 measures the capacitance $C_M$ of the probe and provides at the output a variable proportional to the measured capacitance. This variable is for instance a frequency when in keeping with usual practice the probe is employed as the frequency-determining member of an oscillator circuit, the frequency of which then depends directly on the probe capacitance $C_M$. The probe capacitance could, however, be represented by some other electrical variable, for instance, by a current or a voltage.

The signal representing the probe capacitance is applied, on the one hand, to a first input of the comparator 22 and, on the other, to the calculating unit 23. The calculating unit 23 furnishes to a second input of the comparator 22 a signal which dictates the threshold value $C_S$. The comparator 22 compares the measured capacitance value $C_M$ furnished by the capacitance measuring circuit 21 to the threshold value $C_S$ furnished by the calculating unit 23 and outputs a binary signal having the value 1 or 0 which indicates whether the measured capacitance value $C_M$ is greater or smaller than the threshold value $C_S$. This binary output signal controls the relay 15.

The calculating unit 23 is formed by a microcomputer which contains a memory 24 and is programmed so that it calculates the threshold value $C_S$ in the way as described in the following. The calculating unit 23 has three further inputs to which binary control signals A, B, C are applied. These signals are set by the operator and have the following meaning:

when the signal A has the value 1, this indicates to the calculating circuit 23 that the measured capacitance value $C_M$ originates from an uncovered probe;

when the signal B has the value 1, this indicates to the calculating circuit 23 that the measured capacitance value $C_M$ originates from a completely covered probe;

when the signal C has the value 1, this indicates to the calculating circuit 23 that the threshold value $C_S$ needs to be checked and, if necessary, recalculated, for switching point optimization.

The electronic circuitry 16 assigned to the probe 13 has the same configuration and the same functioning as the electronic circuitry 14.

Following installation of the probe or following a change in the operating conditions the instrument is calibrated to the available capacitance value, this being in the case of an uncovered probe the capacitance value $C_{min}$ and in the case of a covered probe the capacitance value $C_{max}$. Determining the threshold value $C_S$ for the optimum switching point is done in both cases by a different procedure, this being the reason why each is described separately in the following.

1. Calibration for an uncovered probe

The signal A has the value 1 and the signal B has the value 0, as a result of which the calculating unit 23 is indicated that the measured capacitance value $C_M$ furnished by the capacitance measuring circuit 21 corresponds to the capacitance value $C_{min}$. The calculating unit 23 thus stores the measured capacitance value $C_M$ as the first reference value $C_0$ in the memory 24:

$$C_0 = C_M = C_{min}.$$

Since the capacitance value $C_{max}$ is not known, the calculating unit 23 forms a provisional second reference value $C_1$ by adding to the first reference value $C_0$ a prescribed value $\Delta C$:

$$C_1 = C_0 + \Delta C.$$

The value $\Delta C$ is a value specific to the probe which corresponds, for instance, to the smallest permissible switching interval. The second reference value $C_1$ is thus as a rule substantially lower than the capacitance value $C_{max}$; it is also stored in the memory 24. Furthermore, the calculating unit 23 memorizes in the memory 24 whether at the time of calibration the signal A or the signal B has the value 1. This is done, for example, by a signal X being stored to which for A=1 the value 0 and for B=1 the value 1 is assigned. In the present case the value X=0 is thus stored.

Then, the calculating unit 23 calculates the threshold value $C_S$ according to a prescribed function from the difference between the two stored reference values $C_1$ and $C_0$:

$$C_S = f(C_1 - C_0).$$

In the simplest case this function is selected so that the threshold value $C_S$ lies precisely in the middle between the two stored reference values $C_1$ and $C_0$, the function then being:

$$C_S = C_0 + (C_1 - C_0)/2 = (C_1 + C_0)/2.$$

The calculated threshold value $C_S$ is also stored in the memory 24.

Since a threshold value now exists, the operation of the level limit switch is enabled. The stored threshold value $C_S$ is applied to the comparator 22 which compares the measured capacitance value $C_M$ furnished by the capacitance measuring circuit 21 to the threshold value $C_S$. The signal A is again set to 0, and the signal C is set to 1, so that in further operation a switching point optimization occurs. For this purpose the calculating unit 23 checks in regular intervals whether the measured capacitance value $C_M$ furnished by the capacitance measuring circuit 21 exceeds the stored second reference value $C_1$ by more than a predetermined amount $\Delta C_x$, this being the case when the probe is covered fully or partly by material:

$$C_M > C_1 + \Delta C_x.$$

If this is the case, the stored second reference value $C_1$ is replaced by the current measured value $C_M$:

$$C_1 = C_M.$$

The new reference value $C_1$ may be the maximum capacitance value $C_{max}$ if when it was sensed the probe was completely covered by material, it may however also be a smaller value if it was sensed with the probe partly covered.

Following this, a new threshold value $C_S$ is calculated from the stored reference values $C_1$ and $C_0$ according to the prescribed function:

$$C_S = f(C_1 - C_0).$$

This new threshold value $C_S$ is stored in the memory 24 and applied to the comparator 22 which now compares the measured capacitance values $C_M$ furnished by the capacitance measuring circuit 21 to this threshold value.

If in further operation of the level limit switch the calculating unit 23 again establishes that a measured capacitance value $C_M$ furnished by the capacitance measuring circuit 21 exceeds the second reference value $C_1$ last stored by more than the amount $\Delta C_x$, the procedure as described before is repeated, i.e. this measured capacitance value is stored as the second reference value $C_1$, and a new threshold value $C_2$ is calculated according to the prescribed function from the stored reference values $C_0$ and $C_1$.

2. Calibration with probe completely covered

The signal A has the value 0 and the signal B has the value 1, as a result of which the calculating unit 23 is indicated that the measured capacitance value $C_M$ furnished by the capacitance measuring circuit 21 corresponds to the capacitance value $C_{max}$. The calculating unit 23 thus stores the measured capacitance value $C_M$ as the first reference value $C_1$ in the memory 24:

$$C_1 = C_M = C_{max}.$$

Since the capacitance value $C_{min}$ is not known, the calculating unit 23 forms a provisional second reference value $C_0$ by subtracting from the first reference value $C_1$ a prescribed value $\Delta C$:

$$C_0 = C_1 - \Delta C.$$

The second reference value $C_0$ is as a rule substantially higher than the capacitance value $C_{min}$; it is also stored in the memory 24. Moreover, the stored signal X is set to the value 1.

Then, the calculating unit 23 calculates the threshold value $C_S$ in the way as described before according to the prescribed function from the difference between the two stored reference values $C_1$ and $C_0$:

$$C_S = f(C_1 - C_0),$$

in the case of the example as given before, i.e. according to the function $$C_S = C_0 + (C_1 - C_0)/2 = (C_1 + C_0)/2.$$

The calculated threshold value $C_S$ is stored in the memory 24.

Subsequently, operation of the level limit switch is enabled. The stored threshold value $C_S$ is applied to the comparator 22 which compares the measured capacitance value $C_M$ furnished by the capacitance measuring circuit 21 to the threshold value $C_S$. The signal B is set to 0, and the signal C is set to 1, so that in further operation a switching point optimization occurs. For this purpose the calculating unit 23 checks in regular intervals whether the measured capacitance value $C_M$ furnished by the capacitance measuring circuit 21 has dropped below the stored second reference value $C_0$ by more than a predetermined amount $\Delta C_x$, this being the case when the probe is no longer covered or merely partly so by material:

$$C_M < C_0 - \Delta C_x.$$

If this is the case, the stored second reference value $C_0$ is replaced by the current measured value $C_M$:

$$C_0 = C_M.$$

The new reference value $C_0$ may be the minimum capacitance value $C_{min}$ if when it was sensed the probe was completely uncovered by material, it may however also be a larger value if it was sensed with the probe still partly covered.

Following this, a new threshold value $C_S$ is calculated from the stored reference values $C_1$ and Co according to the prescribed function:

$$C_S = f(C_1 - C_0).$$

This new threshold value $C_S$ is stored in the memory 24 and applied to the comparator 22 which now compares the measured capacitance values $C_M$ furnished by the capacitance measuring circuit 21 to this threshold value.

If in further operation of the level limit switch the calculating unit 23 again establishes that a measured capacitance value $C_M$ furnished by the capacitance measuring circuit 21 drops below the second reference value $C_0$ last stored by more than the amount $\Delta C_x$, the procedure as described before is repeated, i.e. this measured capacitance value is stored as the second reference value $C_0$, and a new threshold value $C_S$ is calculated from the difference of the stored reference values $C_1$ and $C_0$.

In both cases for the calibration as described above with the probe uncovered and with it being completely covered an optimum adaptation of the switching point thus occurs, although only one capacitance value of the probe is sensed.

If the signal C is set to 0, no further switching point optimization occurs, and the level limit switch continues operation with the threshold value $C_S$ last stored.

Instead of the function as stated before by way of example, which always holds the threshold value $C_S$ precisely in the middle between the two stored reference values $C_0$ and $C_1$, any other desired function may, of course, be employed for calculating the threshold value $C_S$. For calculating the threshold value $C_S$ the following considerations are decisive:

The difference between the threshold value $C_S$ and the lower reference value $C_0$ should be large so that the switching intervall is as large as possible. The formation of deposits on the probe increases the measured capacitance of the probe in its uncovered condition and reduces the switching intervall so that in the case of a threshold value which is too low there is the risk of the measured capacitance exceeding the threshold value and feigning achievement of the level to be monitored although the probe in reality is still not covered by the material.

The difference between the upper reference value $C_1$ and the threshold value $C_S$ must not be too slight, otherwise there is a risk that moderate changes in the dielectric constant of the material, e.g. due to changes in moisture content, may cause the switching point to be no longer attained.

A favorable compromise between these two requirements, which contradict each other, is that the threshold value $C_S$ increases linearly for small values of the difference $C_1-C_0$, e.g. in accordance with the function as given above $$C_S = C_0 + (C_1 - C_0)/2$$

and remains constant above a predetermined value of the difference $C_1-C_0$. Other functional relationships between the threshold value $C_S$ and the difference $C_1-C_0$ are also possible, for instance, the function $$C_S = C_0 + (C_1 - C_0)^{1/2}.$$

And, of course, for the upper probe 12 the first reference value may also be sensed in the covered condition when the container 10 is just overfilled, and conversely for the lower probe 13 the first reference value in the uncovered condition may be sensed when the container is completely empty.

In the example embodiment as described above the storage of a new second reference value and calculation of a new threshold value always takes place when the calculating unit 23 detects that a measured capacitance value deviates by more than the prescribed amount $\Delta C_x$ from the stored second reference value. To diminish the influence of disturbances or sporadic measurement errors, one advantageous modification of the described method consists of the comparison being made not on the basis of individual measured capacitance values but on the basis of the average value of a prescribed number of measured capacitance values occurring in sequence. Forming this average value is done in the calculating unit 23.

One variant of this modification involves allowing the calculating unit to undertake determining the deviation at the individual measured capacitance values, but then not to calculate a new threshold value until the deviation has been established at a prescribed number of measured capacitance values in sequence.

What is claimed is:

1. A method of setting the switching point of a capacitive level limit switch used for monitoring the level of a material in a container and comprising:

a capacitive probe fitted at the height of the level to be monitored so that it is covered by the material when the level has attained this height, the probe having in the covered condition a higher capacitance value than in the uncovered condition, a capacitance measuring circuit which measures the capacitance of the probe and outputs a signal representing the measured value of the capacitance, and a comparator which compares the measured capacitance value to a variable threshold value determined by the switching point and outputs a binary signal, the status of which depends on whether the measured capacitance value lies above or below the threshold value, wherein for calibrating the level limit switch and for setting the switching point, the measured capacitance value available in the existing operating condition is stored as a first reference value;

a second reference value is stored which is formed by adding a predetermined amount to the first reference value when the first reference value has been sensed with the probe uncovered or by subtracting a predetermined amount from the first reference value when the first reference value has been sensed with the probe covered;

the threshold value is calculated according to a prescribed function from the difference of the two reference values stored so that it lies between the two reference values;

in further operation the capacitance measured values are continually compared to the stored second reference value and a measured capacitance value is stored as a new second reference value when it, should the first reference value have been sensed for an uncovered probe, exceeds the stored second reference value by more than a predetermined amount or, should the first reference value have been sensed with the probe covered, when it fails to attain the stored second reference value fails by more than a predetermined amount;

after each storage of a new reference value the threshold value is recalculated according to the prescribed function from the difference of the two threshold values stored.

2. The method has set forth in claim 1, wherein said prescribed function is determined so that the threshold value for all values of the difference of the two reference values lies in the middle between said two reference values.

3. The method has set forth in claim 1, wherein said prescribed function is determined so that the threshold value up to a prescribed maximum value of the difference of said two reference values lies in the middle between said two reference values and for greater values of the difference has a constant value.

4. The method has set forth in claim 1, wherein said prescribed function results in a non-linear relationship between said threshold value and the difference of the said two reference values.

5. The method has set forth in claim 1, wherein together with said first reference value a signal is stored which indicates whether said first reference value has been sensed for a covered or an uncovered probe.

6. The method has set forth in claim 1, wherein the average value of a prescribed number of measured capacitance values is formed and stored as a new second reference value when it deviates by more than said prescribed amount from said stored reference value.

7. The method has set forth in claim 1, wherein storage of said new second reference value does not occur until a prescribed number of measured capacitance values in sequence has deviated by said prescribed amount from said stored reference value.

8. A capacitive level limit switch for monitoring the level of a material in a container comprising a capacitive probe fitted at the height of the level to be monitored so that it is covered by the material when the level has attained this height, the probe having in the covered condition a higher capacitance value than in the uncovered condition, a capacitance measuring circuit which measures the capacitance of the probe and outputs a signal representing the measured value of the capacitance, a comparator which compares the measured capacitance value to a variable threshold value determined by the switching point and outputs a binary signal, the status of which depends on whether the measured capacitance value lies above or below the threshold value, and a program-controlled calculating unit, for storing said measured capacitance value available in the existing operating condition as a first reference value;

for calculating a second reference value by adding a predetermined amount to said first reference value when said first reference value has been sensed with the probe uncovered or by subtracting a predetermined amount from said first reference value when said first reference value has been sensed with the probe covered;

for calculating the threshold value according to a prescribed function from the difference of the two reference values stored so that said threshold value lies between the two reference values;

for continual comparison of said capacitance measured values to said stored second reference value and for storing a capacitance measured value as the new, second reference value when it, should the first reference value have been sensed for a uncovered probe, exceeds said stored second reference value by more than a predetermined amount or, should the first reference value have been sensed with the probe covered, when it fails to attain said stored second reference value by more than a predetermined amount;

for calculation of a new threshold value according to said prescribed function from the difference of said two threshold values after each storage of a new reference value, said calculating unit receiving at one input said measured capacitance values from the output of said capacitance measuring circuit and furnishing said stored threshold value at an output to said comparator.

9. The capacitive level limit switch as set forth in claim 8, wherein said calculating unit receives at further inputs signals which indicate whether a measured capacitance value has been sensed with said probe covered or uncovered.

10. The capacitive level limit switch as set forth in claim 8, wherein said calculating unit receives at a further input a control signal which establishes whether the calculation of new threshold values for optimizing the switching point is to be effected or not.

* * * * *